United States Patent [19]

Matsui et al.

[11] Patent Number: 4,519,038
[45] Date of Patent: May 21, 1985

[54] OPTIMIZING SPARK TIMING CONTROL APPARATUS AND METHOD

[75] Inventors: Takeski Matsui, Toyohashi; Hideo Ohyama, Toyota; Ryosuke Tachi, Kariya; Teruyoshi Ito; Motoshi Kawai, both of Kariya, all of Japan

[73] Assignee: Nippondenso Co., Ltd., Kariya, Japan

[21] Appl. No.: 381,508

[22] Filed: May 24, 1982

[30] Foreign Application Priority Data

May 27, 1981 [JP] Japan .................. 56-80572

[51] Int. Cl.³ .............. F02P 5/08; F02B 5/02
[52] U.S. Cl. ................. 364/431.03; 123/417; 123/418; 123/422; 364/431.05
[58] Field of Search ........... 364/431.03, 431.04, 364/431.05, 431.06; 123/414, 416, 417, 418, 422, 423

[56] References Cited

U.S. PATENT DOCUMENTS

| | | | |
|---|---|---|---|
| 4,256,073 | 3/1981 | Kobashi et al. | 123/417 X |
| 4,298,941 | 11/1981 | Furuhashi | 123/417 X |
| 4,324,217 | 4/1982 | Ina et al. | 123/417 |
| 4,367,530 | 1/1983 | Morinaga et al. | 364/431.06 |
| 4,373,489 | 2/1983 | Yamaguchi | 123/423 X |
| 4,380,983 | 4/1983 | Kobashi et al. | 123/416 X |

Primary Examiner—Felix D. Gruber
Attorney, Agent, or Firm—Cushman, Darby & Cushman

[57] ABSTRACT

In response to a predetermined engine crankshaft position a reference pulse is generated having a leading edge advanced with respect to that predetermined position as a function of the rotational speed of the crankshaft. At low engine speeds the reference pulse is directly used as the ignition current. A start-of-dwell-time data word is derived in response to the trailing edge of the reference pulse and an end-of-dwell-time data word is derived in response to the leading edge of a subsequent reference pulse. These data words are used for engine operations at constant high speeds to advance the beginning and end of the dwell time of ignition current by an amount commensurate with an increase in engine speed. When the engine is rapidly accelerated the dwell time is started in response to the leading edge of the reference pulse and terminated when the end-of-dwell-time data word is decremented to zero.

8 Claims, 7 Drawing Figures

OPTIMIZING SPARK TIMING CONTROL APPARATUS AND METHOD

BACKGROUND OF THE INVENTION

The present invention relates to spark timing control systems for internal combustion engines, and in particular to a method and apparatus of high precision spark timing control for all engine operations.

Various types of electronic ignition timing control systems have been developed for maximizing the thermal efficiency of internal combustion engines to meet increasing demands of energy savings.

Conventional systems employ a ferromagnetic toothed wheel having 90 teeth, for example, around the circumference thereof, the wheel being mounted on a pulley which is in turn coupled to the engine crankshaft for obtaining the necessary precision. Two electromagnetic pickup coils are provided to produce 180 pulses for each revolution of the crankshaft, the frequency of the pulses being multiplied by a waveform shaping circuit to 360 pulses per crankshaft revolution. A reference position signal is obtained in response to the piston of each engine cylinder reaching top dead center (TDC). This reference position signal is used to trigger a counter to initiate counting the engine speed-related pulses and provide an ignition pulse when this count value corresponds to an ignition target value.

Problems associated with prior art system include the limited space available for mounting the pair of pickup coils, the unreliable operation due to an increased number of electrical connections between the pickup coils and control circuitry, and the higher costs due to the complex signal processing circuitry.

According to another prior art approach, the reference position is advanced from the TDC point by a predetermined angle and a predicted spark timing is derived from the time elapsed from the reference position signal and ignition occurs after the lapse of a predetermined time.

This prior art method allows a simplified design for sensors and waveform shaping circuits with a consequential reduction in costs and increase in reliability. However, if the optimum advance angle is lagged substantially with respect to the reference pulse, the spark timing tends to deviate substantially during acceleration. More specifically, to obtain maximum thermal efficiency, conventional automotive engines have a maximum advance angle of 60 degrees before TDC. When the engine is accelerated rapidly as, for example, from an idling speed of 600 rpm to as high as 6000 rpm within a period of about 1 second, actual spark timing deviates as much as 12 degrees from the correct firing point.

SUMMARY OF THE INVENTION

It is therefore an object of the present invention to provide spark timing control which eliminates prior art problems during rapid acceleration of engines by utilizing a reference pulse having a leading edge advanced with respect to TDC as a function of engine speed in order to start the dwell time of spark current in the primary of an ignition coil when the engine is accelerated.

According to the invention, a reference pulse is generated in response to a predetermined engine crankshaft position. The reference pulse has a leading edge which is advanced with respect to the predetermined crankshaft position or TDC as a function of the speed of rotation of the crankshaft, and it has a trailing edge substantially coinciding with the TDC. In response to the trailing edge of a preceding reference pulse, a first and a second value representing respectively first and second predicted periods of time are derived from engine power demand and crankshaft speed. A first period of time is measured in response to the trailing edge of the preceding reference pulse for detecting a first match between the first predicted period of time and first measured period of time. A second period of time is measured in response to the leading edge of a subsequent reference pulse for detecting a second match between the second predicted period of time and second measured period of time. The dwell time for spark current begins with the leading edge of the subsequent reference pulse if the engine speed is lower than a predetermined value, or it begins with either the leading edge of said subsequent reference pulse or the first match (whichever occurs earlier than the other) if the crankshaft speed is higher than the predetermined value. The dwell time is terminated with the trailing edge of the subsequent reference pulse if the crankshaft speed is lower than the predetermined value, or terminated with the second match if the crankshaft speed is higher than the predetermined value.

At low engine speeds the dwell time corresponds to the duration of each reference pulse while at higher engine speeds the dwell time of the same duration as the reference pulse is advanced as a function of engine speed. During periods of rapid acceleration the leading edge of a reference pulse is utilized to initiate the dwell time rather than causing it to respond to the end of a count when it coincides with a previously derived predicted value. Due to the engine-speed-related advancement of the leading pulse edge, the dwell time is initiated without loss of time which would otherwise cause misfiring.

A further advantage of the present invention relates to the fact that it eliminates the need for having a complex, costly pulse generator which generates a plurality of pulses during intervals between successive TDC points for indicating the instantaneous angular position of the engine crankshaft.

BRIEF DESCRIPTION OF THE DRAWINGS

The present invention will be described in further detail with reference to the accompanying drawings, in which.

DETAILED DESCRIPTION

Figure 1:
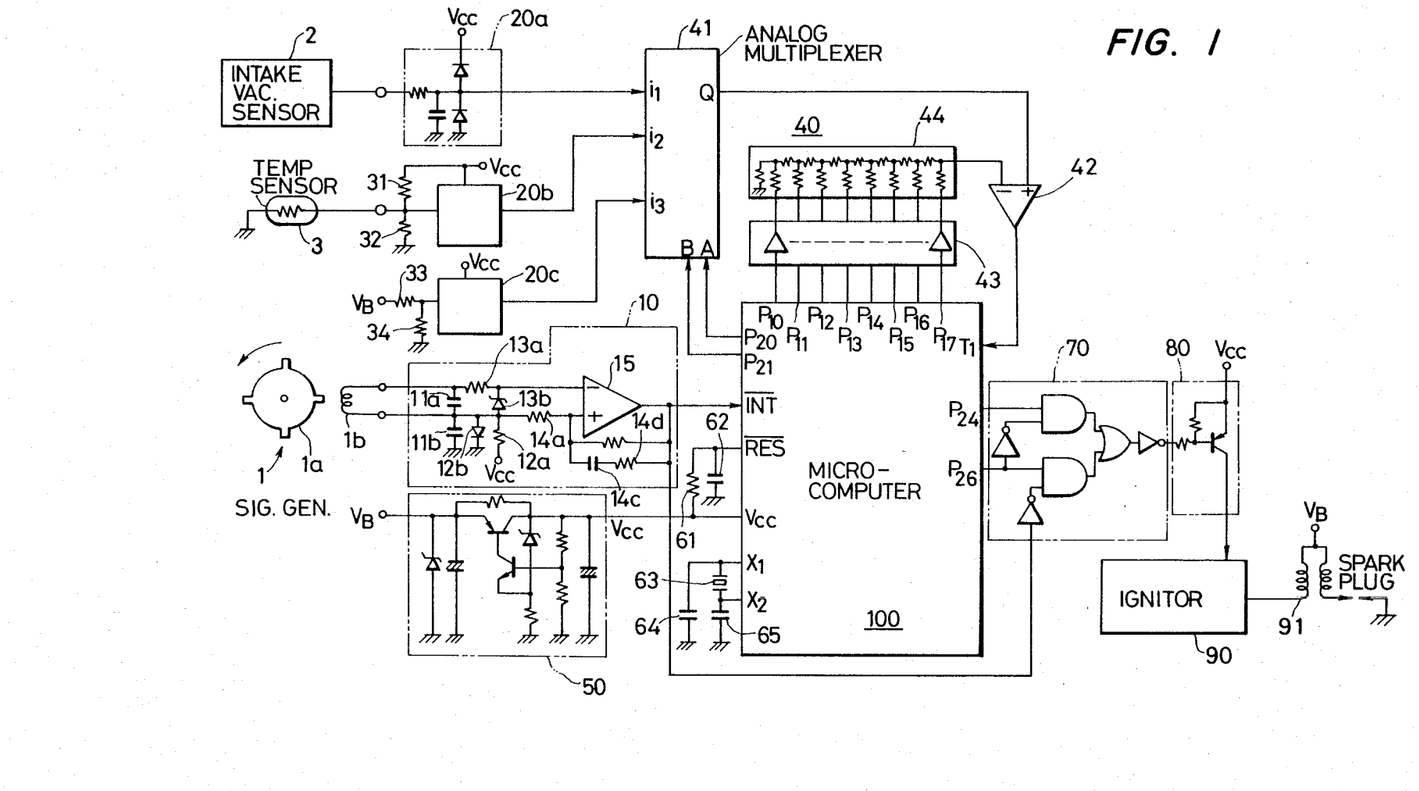
FIG. 1 is a block diagram of a spark timing control system according to the invention.

Referring now to FIG. 1, the ignition control system of the invention includes a reference position signal generator 1 which generates a reference position signal (indicative of engine crankshaft position) with a repetition rate proportional to engine speed. The signal generator 1 comprises a toothed ferromagnetic wheel 1a having a set of four teeth, each corresponding to each cylinder of a four-cycle internal combustion engine, for example, and an electromagnetic transducer 1b fixedly mounted with respect to and in proximity to the circumference of the toothed wheel. Toothed wheel 1a is coupled to the distributor shaft for rotation with the engine crankshaft so that each tooth of the wheel moves past the transducer 1b in response to the piston of each engine cylinder reaching its top dead center (TDC) to cause generation of a voltage signal in the transducer 1b. The transducer 1b is magnetic pickup coil which generates a signal of magnitude varying in proportion to the speed of revolution of the wheel 1a, and hence to engine speed as shown at a in FIG. 2.

Figure 2:
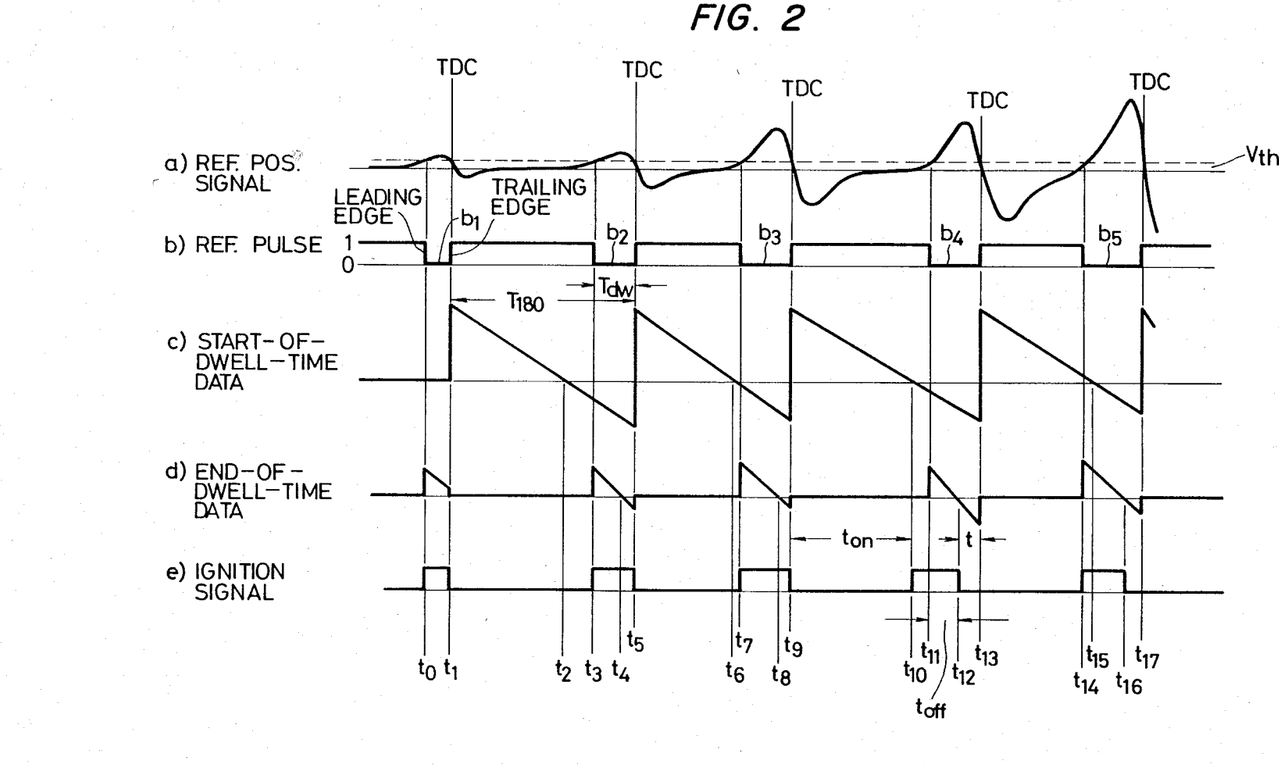
FIG. 2 is a timing diagram useful for describing the operation of the spark timing control system of FIG. 1.
Figure 4:
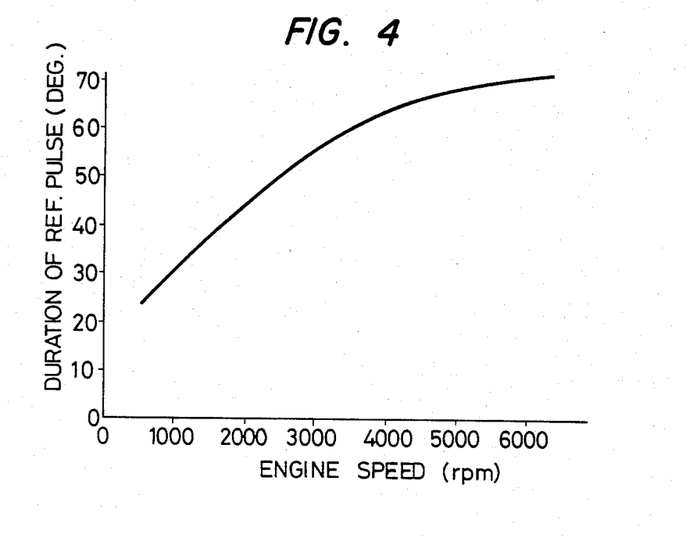
FIG. 4 is a graphic illustration of the operating characteristic of the reference pulse generator of FIG. 1.

Illustrated at 10 is a refererence pulse generator formed by a Schmitt trigger comparator circuit which shapes the waveform of the reference position signal into a pulse signal as shown at b in FIG. 2 by comparing the analog signal with a threshold level Vth. The comparator circuit 10 includes an operational amplifier comparator 15 and a noise eliminating capacitors 11a, 11b, and a bias generator formed by a resistor 12a and and a diode 12b to generate a bias voltage for the comparator 15 to serve as the threshold level Vth. Resistor 13a and diode 13b constitute a limiter to avoid application of overvoltages to the input terminals of the comparator 15. Further included are resistance and capacitance elements 14a, 14b, 14c and 14d which are connected in a feedback path of the comparator 15 to keep it from responding erroneously to slight variations which might still exist in the reference position signal applied thereto. The comparator circuit 10 generates a reference pulse when the engine speed proportional analog signal exceeds the threshold level Vth. Since the analog signal is proportioal to engine speed, the duration of the reference pulse increases as a function of engine speed as shown in FIG. 4, and as a result the leading edge of the reference pulse advances as a function of engine speed while the trailing edge occurs in correspondence with TDC.

The ignition control system includes a microcomputer 100 which may be, for example, an 8048 available from INTEL CORP. Microcomputer 100 includes a microprocessor, a read only memory, a read/write memory (RAM) and an 8-bit counter (TIMER), input/output ports and a clock signal from an external source comprised of quartz oscillator 63 and capacitors 64, 65 to generate the necessry timing signals for the counters and the remainder of the system. The reference pulse from circuit 10 is applied to an interrupt input terminal INT of the microcomputer and is also applied to a gate circuit 70 coupled to output ports $P_{24}$ and $P_{26}$ of microcomputer 100. This gate circuit 70 selectively couples an output pulse at port $P_{24}$ or a reference pulse from the pulse generator 10 in accordance with the binary state of the port $P_{26}$ to a buffer amplifier 80 and then to an ignitor or switching circuit 90 which is coupled to the ignition coil 91.

Numeral 2 indicates an intake vacuum sensor to detect the intake vacuum of the engine for indicating the amount of engine load, the intake vacuum sensor signal being fed to an input terminal $i_1$ of an analog multiplexer 41 via a noise eliminating filter 20a. Illustrated at 3 is an engine coolant temperature sensor, the output of which is coupled to a junction of series connected resistors 31, 32 which are connected to a suitable bias source to bias the coolant temperature signal to a certain DC level, and is applied via a noise eliminating filter 20b to a second input $i_2$ of analog multiplexer 41. Battery voltage, after having been divided by a voltage dividing resistor network 33, 34, is supplied to an input terminal $i_3$ of multiplexer 41 via another noise eliminating filter 20c.

The analog multiplexer 41 is responsive to binary select signals applied from ports $P_{20}$ and $P_{21}$ of microcomputer 100 to the select input terminals A and B thereof to couple the engine parameter signals to an output terminal Q in response to the timing signals generated in the microcomputer. The output of the multiplexer 41 is coupled to the positive input of a comparator 42 for making a comparison with an analog converted digital signal from a digital-analog converter 40 which includes an analog subsystem formed by a buffer amplifier unit 43 and a resistance ladder network 44, and a digital subsystem the function of which is performed by the microcomputer by responding to an input from comparator 42 at terminal $T_1$ and converting it into a plurality of digital signals for application through terminals $P_{10}$ to $P_{17}$ to the buffer 43 and then to the ladder network 44.

Illustrated at 50 is a well known voltage stabilizing circuit which is energized by battery voltage $V_B$ and provides a stabilized voltage Vcc at typically 5 volts. A delay circuit formed by a resistor 61 and a capacitor 62 introduces a certain amount of delay time to a voltage applied to a reset terminal RES of microcomputer 100 with respect to the time of application of voltage to its terminal Vcc to permit the microcomputer to initialize the status of its various elements.

The various counters included in the microcomputer 100 have the following counting functions which are identified by "variables" stored in specified address locations of the random access memory.

(1) A reference pulse interval counter RPIC represented by a variable RPI for counting the interval $T_{180}$ between the trailing edges of successively occurring negative-going reference pulses, which trailing edges occur in response to each TDC point. The interval $T_{180}$ represents the period for every 180 crankangles (CA) of a four-cycle four cylinder engine.

(2) A start-of-dwell-time counter SDWL is used to determine when to start conducting the ignition current through the primary winding of the ignition coil. The counter SDWL is formed by a timer TMR (having a corresponding variable designated TMR) and a software counter formed by a loop of programmed steps having a "variable" designated SDWL which is decremented in response to the generation of a timer interrupt when the timer TMR overflows. The variable SDWL is first initialized to a predetermined value and subsequently to a previously derived feedback parameter.

(3) An ignition timing or end-of-dwell-time counter EDWL having a corresponding variable EDWL is used to determine the end of dwell time at the correct firing point to generate high tension voltage in the secondary winding of the ignition coil. This counter is formed by a software loop having a variable EDWL which is generated in response to a TDC interrupt routine following the leading edge of a reference pulse. The variable EDWL is initialized in response to the TDC interrupt to a feedback parameter derived in a previous ignition cycle and decremented until the occurrence of the trailing edge of the reference pulse.

(4) A reference pulse duration counter RPD is used to generate the initializing value of the counter EDWL. The counter RPD is formed in the same software loop as the counter EDWL and its variable RPD is included in that loop to store data corresponding to the difference between the values of the variable EDWL at the leading and trailing edges of the reference pulse for generating a data word representing the pulse duration Tdw from which the initializing value is derived. Microcomputer 100 contains ignition control data in lookup tables which identify ignition timing data as a function of engine operating parameters.

Figure 3A:
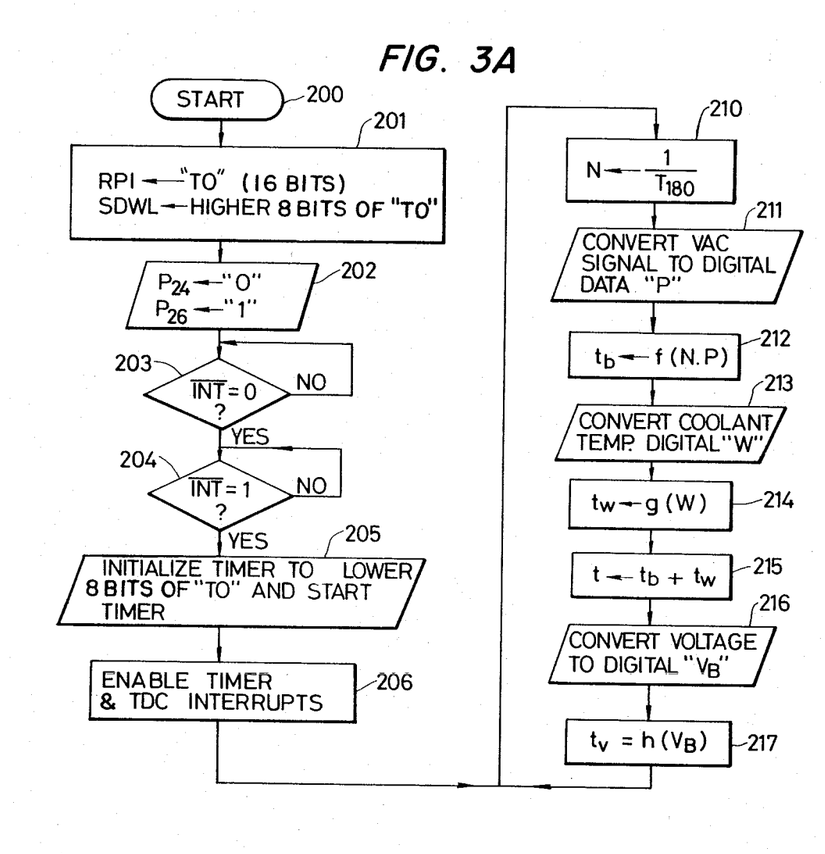
FIGS. 3A and 3B are flow diagrams associated with the microcomputer of FIG. 1.
Figure 3B:
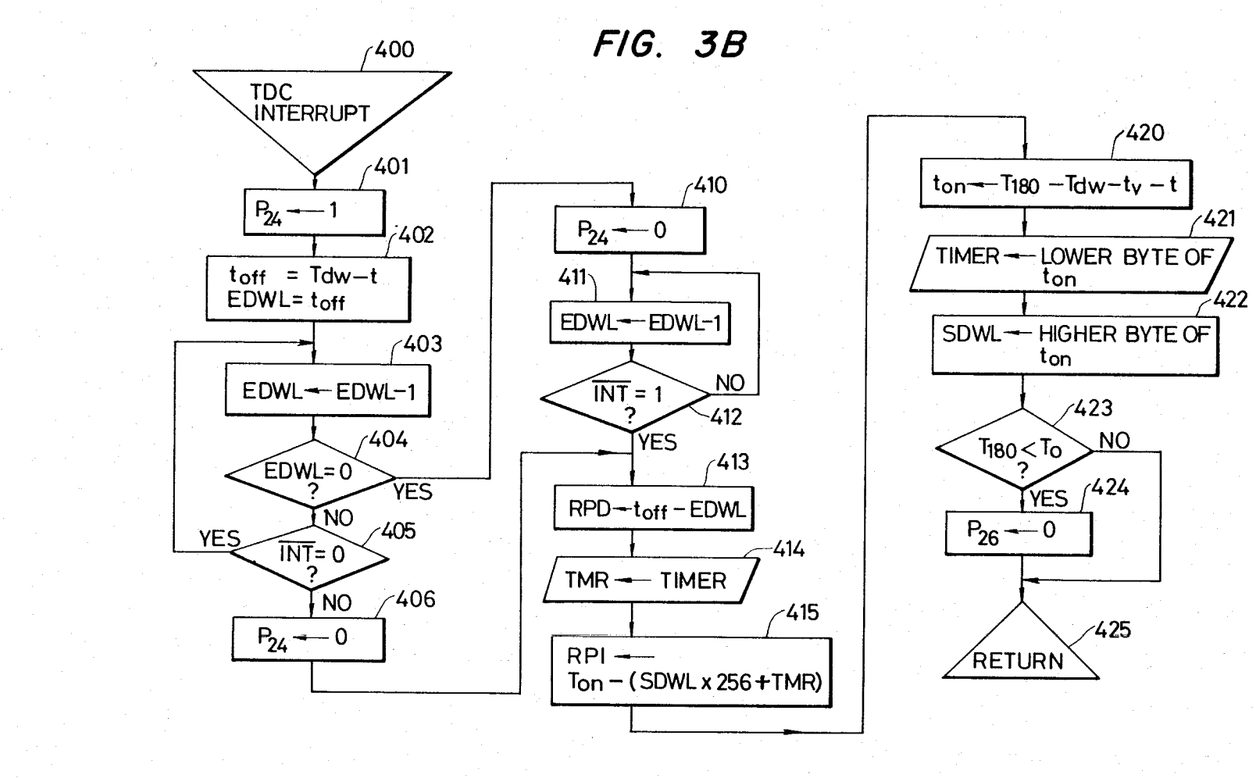

The operation of the microcomputer 100 will now be described with reference to FIGS. 2, 3A and 3B. Description will first be concerned with engine operation at speeds lower than a predetermined value. When the ignition switch is turned on, the battery voltage is applied to the spark timing control system and voltage Vcc is applied from the voltage stabilizer 50 to the microcomputer 100 and its associated circuitry. The reset terminal RES of the microcomputer 100 is impressed with a delayed voltage Vcc as described above to perform initialization in the microcomputer and to enable it to start processing programmed instructions from Step 200, FIG. 3A. In Step 201 the reference pulse interval variable RPI is initialized to a predetermined constant value "TO" (which is represented by 16 bits), the higher eight bits of which are used to initialize the variable SDWL. In Step 202 the binary conditions of ports $P_{24}$ and $P_{26}$ are set to logical levels "0" and "1", respectively, to directly supply the ignitor 90 with reference pulses "b".

At time $t_0$ a reference pulse b1 is fed to the interrupt terminal $\overline{INT}$ of the microcomputer 100. The "0" level condition at terminal $\overline{INT}$ is detected in Step 203 followed by Step 204 which detects whether the interrupt terminal $\overline{INT}$ has changed to logical "1" level. Step 204 is repeatedly executed until time $t_1$ at which time the reference pulse changes to logical "1" level. The 8-bit counter (TIMER) is initialized in Step 205 to the lower eight bits of the initializing value "TO". In Step 206, the microprocessor enables the timer and reference pulse interrupts.

During the period between times $t_1$ and $t_2$, various engine parameter analog inputs are processed in a subroutine comprising a loop of Steps 210 through 217. In Step 210, an engine speed data word N is derived from the TDC-TDC period data stored in a cell corresponding to variable RPI which has been derived from the reference pulse interval counter RPIC. In Step 211 the microprocessor places logical "0"s to the ports $P_{20}$ and $P_{21}$ to cause the multiplexer 41 to select the intake vacuum signal from sensor 2 to convert it to a corresponding intake vacuum data word P. In Step 212, there is derived a basic ignition timing data word $t_b$ from a look-up table as a function of engine speed data N and intake vacuum data P. The basic firing time data word represents the ignition angle advanced with respect to TDC. In Step 213, the engine coolant temperature is converted to a corresponding digital value W and subsequently, in Step 214, coolant compensation period data word $t_w$ is derived from a look-up table as a function of W. In the next Step at 215, data $t_b$ and $t_w$ are summed up to derive a predicted optimum advance angle data word t. The battery voltage $V_B$ is converted to a corresponding digital value. Finally in Step 217, a period data word $t_v$ is derived from a look-up table as a function of battery voltage data $V_B$ for purposes of compensating for the dwell time of the ignition signal.

When the 8-bit counter (TIMER) is overflowed, the microprocessor transfers control from the main routine to a timer interrupt routine 300 which represents the software loop counter SDWL. The timer interrupt routine includes Step 301 where the variable SDWL is checked if it has reduced to zero, and if not, the control exits to Step 303 to decrement the variable SDWL by one, terminating the interrupt routine at Step 304. The sawtooth waveform c, FIG. 2, indicates on analog scale a combined count value of the 8-bit counter (TIMER) and the variable SDWL. The timer interrupt occurs at periodic intervals to decrement the value of start-of-dwell-time variable SDWL.

It is assumed that in FIG. 2 the SDWL variable is decremented to zero at time $t_2$ by satisfying the statement of Step 301 to execute Step 302 to switch the binary state of the port $P_{24}$ from "0" to "1". With the port $P_{26}$ being set at the logical "1" state in Step 202 in the main routine, no changes occur in the binary condition at the output to the ignitor 90 so that no current flows in the ignitor.

At time $t_3$ a reference pulse b2 is generated and passed through the gate circuit 70, which is enabled by the logical "1" at port $P_{26}$. At time $t_5$ a top-dead-center (TDC) interrupt command is generated and the microcomputer transfers control to Step 400 of the TDC interrupt routine shown in FIG. 3B.

In Step 401, port $P_{24}$ is set to a logical "1" while port $P_{26}$ is still at logical "1". The application of the logical "1" to $P_{24}$ does not effect on the gate circuit 70 until the binary level at port $P_{26}$ changes to zero. As will be described hereinbelow the duration Tdw of a preceding reference pulse is measured in Step 413 during the previous interrupt routine. In Step 402 the microprocessor computes an initializing value $t_{off}$ by taking the difference between the previously obtained Tdw and an optimum advance angle value t and initializes the end-of-dwell-time variable EDWL to $t_{off}$. During the period between $t_3$ and $t_4$, Steps 403, 404 and 405 are repeatedly executed to decrement the end-of-dwell-time variable EDWL by one in Step 403 while checking its value $t_{off}$ against zero in Step 404 and checking the presence of a reference pulse at the TDC interrupt terminal $\overline{INT}$ in Step 405. It is seen from FIG. 2 that since the value $t_{off}$ of variable EDWL reduces to zero at a point preceding the trailing edge of reference pulse b2, control exits from step 404 to Step 410 at time $t_4$ to place "0" at port $P_{24}$.

Thus, Step 406 will be executed only when EOWL=0 occurs following the trailing edge of a reference pulse. Such a situation will occur when the engine is decelerated to a low speed so that the initial value $t_{off}$ is large in comparison with the reference pulse duration Tdw. In that instance a Step 406 will be executed to place a "0" to port $P_{24}$ at the trailing edge of the reference pulse in order to proceed with an initializing subroutine including Steps 413 through 422 to initialize the variable SDWL.

The port $P_{24}$ thus remains at logical "1" level during time $t_3$ to $t_5$. However, since port $P_{26}$ is held at logical "1" level during this period, the logical "1" at port $P_{24}$ is change to zero level and the reference pulse b2 is passed to the ignitor 90 during period $t_3$-$t_5$.

During the period $t_4$ to $t_5$, Steps 411 and 412 are repeatedly executed to decrement $t_{off}$ until the trailing edge of the reference pulse b2 occurs. In Step 413, the reference pulse duration Tdw is detected by taking the difference between the values of variable EDWL at times $t_3$ and $t_5$. In Step 414 the value of the timer TMR is read to be utilized in a Step 415 to detect a reference pulse interval $T_{180}$ corresponding to the time in which the crankshaft of the four-cylinder four-cycle engine has rotated through 180 degrees. This is accomplished by taking the difference between an initializing value to which the start-of-dwell-time counter SDWL is initialized at time $t_1$ and the value (SDWL×256+TMR) which is derived at time $t_5$. It is to be noted that in each of the subsequent ignition cycles the start-of-dwell-time variable SDWL is initialized to a 16-bit feedback parameter $t_{on}$ which is obtained in Step 420. In the Step 420, a combined value of reference pulse duration Tdw, voltage compensation period $t_v$ and ignition advance angle t is subtracted from the reference pulse interval $T_{180}$ to derive a 16-bit initializing data word $t_{on}$ for the next ignition cycle. The lower eight bits of the initializing value $t_{on}$ are loaded into the 8-bit counter (TIMER) in Step 422 and its higher eight bits are loaded into the variable (i.e., counter value) SDWL in Step 422. In Step 423 the microprocessor compares the reference pulse interval $T_{180}$ with a preset value To corresponding to the above noted predetermined engine speed and exits to Step 425 if the engine speed (block 423, FIG. 3B) is still lower than that predetermined speed and returns to the main routine. The microprocessor repeats similar operations during a subsequent period from $t_5$ to $t_9$ to those in the period from $t_1$ to $t_5$. Therefore, during the period prior to time $t_9$ when the engine is run at low speeds from the start of the engine, the reference pulse is directly applied through the gate circuit 70 to the ignitor. After time $t_9$ the variable SDWL is decremented successively so that at time $t_{10}$ its value is reduced to zero which, is detected in Step 301 to place a logical "1" to port $P_{24}$ in Step 302.

If the engine speed is assumed to have increased to a level above the predetermined speed during a period prior to a subsequent ignition cycle, a Step 424 will be executed in the subsequent TDC interrupt routine to lower the binary level at port $P_{26}$ to "0".

Description will now be concerned with an operation beginning at time $t_{10}$ in which the engine is assumed to be run at a substantially constant but higher speed than the predetermined value t0, with the assumption that the potential at port $P_{26}$ was switched to "0" level in Step 424 in a previous ignition cycle causing the logical "1" at port $P_{24}$ to be enabled by the gate circuit 70 and passed to the ignitor 90. Thus the dwell time of the ignition pulse runs from time $t_{10}$ which is advanced with respect to the leading edge of a reference pulse b4 as illustrated in FIG. 2. In response to the leading edge of the reference pulse b4 at time $t_{11}$, a TDC interrupt is generated causing the microprocessor to transfer control to TDC interrupt routine to issue a command to apply a logical "1" to port $P_{24}$ in Step 401. However, this command is ignored since the port $P_{24}$ was switched to "1" in Step 302 at time $t_{10}$ and remains in this binary state. Subsequently Step 402 is executed to compute the difference $t_{off}$ between the reference pulse duration Tdw (=$t_9-t_7$) of the previous ignition cycle and the predicted optimum advance angle t which was obtained in Step 215 of the main routine, and set the end-of-dwell-time variable EDWL to $t_{off}$ in Steps 403 to 405, the value $t_{off}$ of end-of-dwell-time variable EDWL is decremented in succession until time $t_{12}$ at which time the statement in Step 404 is satisfied to exit to Step 410 to place a "0" to port $P_{24}$, thus turning off the ignition current at $t_{12}$.

The Steps 411 and 412 are then repeatedly executed until time $t_{13}$, at which time the reference pulse becomes a logical "1". The reference pulse duration Tdw between times $t_{11}$ and $t_{13}$ is then computed at Step 413.

During constant speed operations the reference pulse duration Tdw is maintained constant so that the ignition current dwell time equals the duration Tdw. On the other hand, the ignition timing which occurs at time $t_{12}$ is delayed by a period $t_{off}$ from the trailing edge of the reference pulse b3 but advanced by the predicted advance angle t.

Description will now be concerned with an operation in which the engine is accelerated. At time $t_{13}$, the start-of-dwell-time variable SDWL is initialized in Steps 420, 421 and 422. However, the digital values used in these steps to compute the initializing value $t_{on}$ are too large for acceleration so that the start-of-dwell-time counter SDWL is likely to be decremented to zero after the occurrence of the leading edge of the reference pulse. This results in a loss of ignition current and resulting misfiring. To avoid this problem, when TDC interrupt occurs at $t_{14}$, the potential at port $P_{24}$ is raised to logical "1" in Step 401. Since port $P_{26}$ has been lowered to "0" previously, the application of logical "1" to port $P_{24}$ causes a reference pulse b6 to be applied to the ignitor rather than starting the ignition current at the zero point of the variable SDWL. Likewise, the initializing value $t_{off}$ of the end of dwell time is also too large for acceleration. This problem is avoided as follows. Since the ignition control system of the present invention employs a magnetic pickup for detecting the reference engine crankshaft position and generating an analog signal of which the magnitude varies as a function of the engine speed, the leading edge of reference pulses advances as a function of engine speed and its trailing edge coincides with each TDC point. Therefore, the reference pulse b6 has an advanced leading edge which occurs at time $t_{14}$ and a trailing edge coinciding with TDC at time $t_{17}$. Due to the advanced leading edge of reference pulse b5 the initialized value $t_{off}$ is decremented sufficiently during the period from $t_{14}$ to $t_{16}$ to cause its zero point to occur at an appropriately advanced angle relative to TDC as shown in FIG. 2.

FIG. 4 is a graphic illustration of the reference pulse duration plotted as a function of engine speed. As seen in FIG. 4, the pulse duration varies nonlinearly with the engine speed. This is due to the fact that the voltage induced in the electromagnetic pickup follows different curves as a function of the speed of its wheel 1a and the curves cross a fixed reference at different points. As a result, the leading edge of the reference pulse advances as a function of the engine speed.

Figure 5:
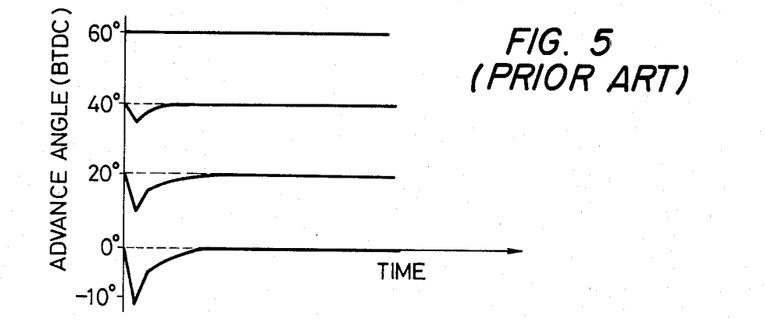
FIG. 5 is a plot illustrating the amounts of deviation of spark timing of conventional engines from optimum firing points at various advance angles.

FIG. 5 is a plot of ignition timing of a conventional four-cylinder 1800-cc engine ignition system during acceleration of from 600 to 6000 rpm within a 1-second period for desired advance angles at 0, 20, 40 and 60 degrees before top dead center. It is seen that there is an ignition timing error which amounts to as much as 12 degrees from the desired 0-angle point.

Figure 6:
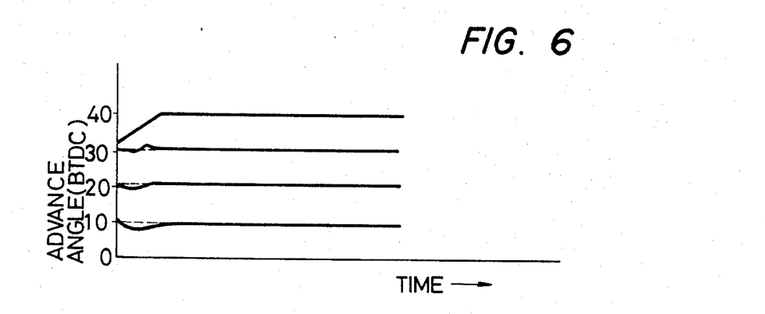
FIG. 6 is a plot illustrating the amounts of deviation of spark timing according to the present invention as measured in similar manner to those of FIG. 5.

FIG. 6 illustrates the amounts of deviation for the present invention of actual spark timing from optimum advance angles of 0-, 20- and 40-degrees before TDC. It is seen from FIG. 5 that deviation occurs with a maximum of 12 degrees from the zero-degree point when engine is rapidly accelerated from 600 rpm to 6000 rpm per second. The spark timing control system of the invention applied to a four-cycle 1800 cc engine has a maximum of 3-degree deviation as illustrated in FIG. 6 when the engine is accelerated from 600 rpm to 6000 rpm per second.

What is claimed is:

1. A method for controlling the spark timing of an internal combustion engine, comprising the steps of:

generating a reference pulse having a leading edge advanced with respect to a predetermined engine crankshaft position as a function of the rotational speed of the engine crankshaft and having a trailing edge substantially coinciding with said predetermined crankshaft position;

deriving from the engine load and the speed of the engine crankshaft a value representing an optimum period of time;

causing ignition current to flow in an ignition device in accordance with the leading edge of said reference pulse;

measuring a period of time in response to said leading edge of said reference pulse; and detecting when said measured period of time corresponds to said optimum period of time and terminating said ignition current at such a detected correspondence.

2. A method as in claim 1, wherein the causing step includes detecting the earlier occuring of either one of the leading edge of said reference pulse and said correspondence between said measured and optimum periods to cause ignition current to flow through said ignition device.

3. A method for generating a rectangular wave output signal in accordance with a predetermined engine crankshaft position, comprising the steps of:

(a) generating a reference pulse having a leading edge advanced with respect to said predetermined crankshaft position as a function of the speed of rotation of the crankshaft and having a trailing edge substantially coinciding with said predetermined crankshaft position;

(b) detecting the trailing edge of a preceding reference pulse and deriving from engine power demand and engine crankshaft speed a first value and successively decrementing said first value;

(c) detecting whether the crankshaft speed is higher than a predetermined value;

(d) detecting the occurrence of (1) said first value being reduced to zero and of (2) the leading edge of a subsequent reference pulse, causing a voltage to rise in response to the detection of the earlier of either one of occurrences (1) and (2) if the crankshaft speed is higher than said predetermined value, and causing said voltage to rise in response to the detection of occurrence (2) if the crankshaft speed is lower than said predetermined value;

(e) deriving from said engine power demand and engine crankshaft speed a second value and successively decrementing said second value; and (f) detecting the trailing edge of said subsequent reference pulse and causing said voltage to fall in response to the detection of the trailing edge if said crankshaft speed is lower than said predetermined value; and (g) detecting when said second value reduces to zero and causing said voltage to fall in response to the detection of the second value becoming zero if said crankshaft speed is higher than said predetermined value.

4. Apparatus for controlling the spark timing of an internal combustion engine having a crankshaft and an ignition device comprising:

reference pulse generating means including means for detecting the rotational speed of said engine crankshaft, and means for generating a reference pulse having a leading edge advanced as a function of the detected rotational speed of the engine crankshaft and having a trailing edge substantially coinciding with a predetermined crankshaft position;

means for detecting the amount of power demand of said engine;

means for generating clock pulses; and means for controlling said engine in response to said detected engine power demand comprising control means for deriving from said engine power demand and detected crankshaft rotational speed a value representing an optimum length of time for ignition of said ignition device, means for causing an ignition current to flow in said ignition device in response to the leading edge of said reference pulse, means for counting said clock pulses in response to said leading edge to provide a count value, and means for detecting when said count value corresponds to said value of optimum length and means for terminating said ignition current in response to said detected correspondence.

5. Apparatus as in claim 4, wherein said causing means further comprises means for detecting the earlier occurrence of the leading edge of said reference pulse and said detected correspondence between said count and optimum values to cause said ignition current to flow through said ignition device in accordance with said detected earlier occurrence.

6. Apparatus for generating a rectangular wave output signal in accordance with a predetermined crankshaft position of an internal combustion engine which is controlled in response to engine power demand, comprising:

means for generating a first signal representing the amount of power demand of said engine;

means for generating a second signal representing the speed of rotation of the engine crankshaft;

means for generating a reference pulse having a leading edge advanced with respect to said predetermined crankshaft position by an amount that is a function of said second signal representing the crankshaft rotation speed and having a trailing edge substantially coinciding with said predetermined crankshaft position;

means for generating clock pulses;

control means comprising means for detecting whether said second signal is higher or lower than a predetermined value, means for deriving from said first and second signals, in response to the trailing edge of a preceding reference pulse, a first and a second value representing respectively first and second optimum periods of time, means for counting said clock pulses in response to said trailing edge to provide a first count value and counting said clock pulses in response to the leading edge of a subsequent reference pulse to provide a second count value, means for detecting a first match between said first value and said first count value and a second match between said second value and said second count value, means for causing a voltage to rise in response to the leading edge of said subsequent reference pulse if said second signal is lower than said predetermined value and in response to the earlier occurring one of said leading edge and said first match if said second signal is higher than said predetermined value, and means for causing said voltage to fall in response to the trailing edge of said subsequent reference pulse if said second signal is lower than said predetermined value and in response to said second match if said second signal is higher than said predetermined value.

7. Apparatus as claimed in claim 4, 5, or 6, wherein said reference pulse generating means further comprises:

a toothed wheel rotating with said crankshaft;

an electromagnetic pickup coil fixedly mounted in proximity with said toothed wheel for generating a signal of magnitude varying as a function of the speed of rotation of said toothed wheel, said signal having a sloped leading edge advanced as a function of the speed of rotation of said wheel with respect to a tooth thereof and a sloped trailing edge substantially coinciding with said tooth; and a comparator for comparing said signal with a reference value to generate an output reference pulse when said signal exceeds said reference value.

8. Apparatus as in claim 6, wherein said control means comprises microcomputer means having an input terminal coupled to the output of a comparator and first and second output terminals, and a gate circuit having a first input terminal coupled to the first output terminal of the microcomputer and a second input terminal coupled to the output of said comparator and a control terminal coupled to said second output terminal of said microcomputer means, and an output terminal coupled to an ignition device, said microcomputer means further including means for:

(a) establishing a logic "0" at said first input terminal of said gate circuit and "1" at the control terminal thereof to disable said first input terminal while enabling the second input terminal thereof;

(b) successively detecting the leading and trailing edges of said reference pulse from said comparator;

(c) enabling a timer interrupt routine and a TDC interrupt routine;

(d) sensing engine operating parameters including the intake vacuum pressure of said engine and the speed of rotation of the engine crankshaft;

(e) counting said clock pulses until a predetermined count is reached to generate an interrupt for said timer interrupt routine, the timer interrupt routine means further including means for detecting SDWL flag=0 to establish "1" at said first input terminal of said gate circuit, and decrementing said variable SDWL;

(f) sensing the leading edge of said reference pulse to generate an interrupt for said TDC interrupt routine, the TDC interrupt routine means further including means for establishing "1" at said first input terminal of said gate circuit, initializing a variable EDWL to said second value as a function of said detected engine parameters, decrementing said variable EDWL, detecting that the value EDWL=0 and, in response, placing "0" at said first input terminal of said gate circuit, repeating the previous two functions until the occurrence of the trailing edge of said reference pulse if DEWL=0 is not detected, further decrementing the variable EDWL until the occurrence of the trailing edge of said reference pulse, reinitializing the variable SDWL to said first value as a function of said detected engine parameters, and detecting whether the speed of engine crankshaft is higher than said predetermined value to establish "0" at the control terminal of said gate circuit to enable the first input terminal of said gate circuit and disable the second input terminal thereof.

* * * * *